(12) United States Patent
Brown (10) Patent No.: US 6,239,434 B1
(45) Date of Patent: May 29, 2001

(54) SOLID STATE OPTICAL SPECTROMETER FOR COMBUSTION FLAME TEMPERATURE MEASUREMENT

(75) Inventor: Dale Marius Brown, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/246,861

(22) Filed: Feb. 8, 1999

(51) Int. Cl.$^7$ .......................................... G01J 5/30
(52) U.S. Cl. .......................................... 250/339.15
(58) Field of Search ......................... 250/339.15

(56) References Cited

U.S. PATENT DOCUMENTS

| | | |
|---|---|---|
| 5,071,106 | 12/1991 | Helkenberg . |
| 5,125,739 | 6/1992 | Suarez-Gonzalez et al. . |
| 5,249,954 * | 10/1993 | Allen et al. ........................ 431/14 |
| 5,257,496 | 11/1993 | Brown et al. ................... 60/39.06 |
| 5,394,005 | 2/1995 | Brown et al. . |
| 5,467,185 | 11/1995 | Engeler et al. .................. 356/44 |
| 5,480,298 | 1/1996 | Brown ............................. 431/79 |
| 5,544,478 | 8/1996 | Shu et al. ...................... 60/39.03 |
| 5,589,682 | 12/1996 | Brown et al. ................ 250/214 A |
| 5,834,331 | 11/1998 | Razeghi . |
| 6,104,074 * | 8/2000 | Chen ............................. 257/453 |

FOREIGN PATENT DOCUMENTS

| | | |
|---|---|---|
| 0417409 A2 | 6/1990 | (EP) . |
| 60036825 | 8/1983 | (JP) . |
| 19950032538 | 9/1995 | (JP) . |

OTHER PUBLICATIONS

Subash Krishnankutty, Wei Yang, Thomas Nohava, P. Paul Ruden, "Fabrication and Characterization of GaN/AlGaN Ultraviolet-Band Heterojunction Photodiodes", Internet Journal of Nitride Semiconductor Research, vol. 3, Apr. 7, 1998, Article 7.

Wei Yang, Thomas Nohava and Subash Krishnankutty, "Ultraviolet Detectors at Honeywell", Compound Semiconductor Summer I, 1998, pp. 22, 24, 30.

Dale M. Brown, E Downey, J Kretchmer, G Michon, E. Shu, D. Schneider, "SIC Flame Sensors for Gas Turbine Control Systems", Solid–State Electronics, vol. 42, No. 5, pp. 755–760, 1998.

Edward Charles Rea, Jr., "Rapid–Tuning Laser Wavelength Modulation Spectroscopy With Applications In Combustion Diagnostics and OH Line Shape Studies", HTGL Report T–272, High Temp. Gasdyn. Lab, Dept. Mech. Eng., Stanford University, Stanford CA 94305 pp. 318–322, Mar. 1991.

* cited by examiner

Primary Examiner—Constantine Hannaher
Assistant Examiner—Otilia Gabor
(74) Attorney, Agent, or Firm—Ann M. Agosti; Jill M. Breedlove (57) ABSTRACT

An optical spectrometer for combustion flame temperature determination includes at least two photodetectors positioned for receiving light from a combustion flame, each of the at least two photodetectors having a different, overlapping bandwidth for detecting a respective output signal in an OH emission band; and a computer for subtracting a respective output signal of a first one of the at least two photodetectors from a respective output signal of a second one of the at least two photodetectors to obtain a segment signal, and using the segment signal to determine the combustion flame temperature.

21 Claims, 6 Drawing Sheets

SOLID STATE OPTICAL SPECTROMETER FOR COMBUSTION FLAME TEMPERATURE MEASUREMENT

BACKGROUND OF THE INVENTION

The invention relates generally to optical flame detection.

Previous silicon carbide flame detectors such as described in Brown et al., U.S. Pat. No. 5,589,682, issued Dec. 31, 1996, detect the presence of a flame and measure the intensity of the flame's photon flux over a wide range of wavelengths. The measured intensity, however, does not always correlate to flame temperature, particularly in multiple flame combustors.

BRIEF SUMMARY OF THE INVENTION

It is therefore seen to be desirable to have a more direct temperature determination technique.

Briefly, in accordance with one embodiment of the present invention, an optical spectrometer for combustion flame temperature determination includes at least two photodetectors positioned for receiving light from a combustion flame, each of the at least two photodetectors having a different, overlapping bandwidth for detecting a respective output signal within the OH emission band; and a computer for subtracting a respective output signal of a first one of the at least two photodetectors from a respective output signal of a second one of the at least two photodetectors to obtain a segment signal, and using the segment signal to determine the combustion flame temperature.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF THE INVENTION

Figure 1:
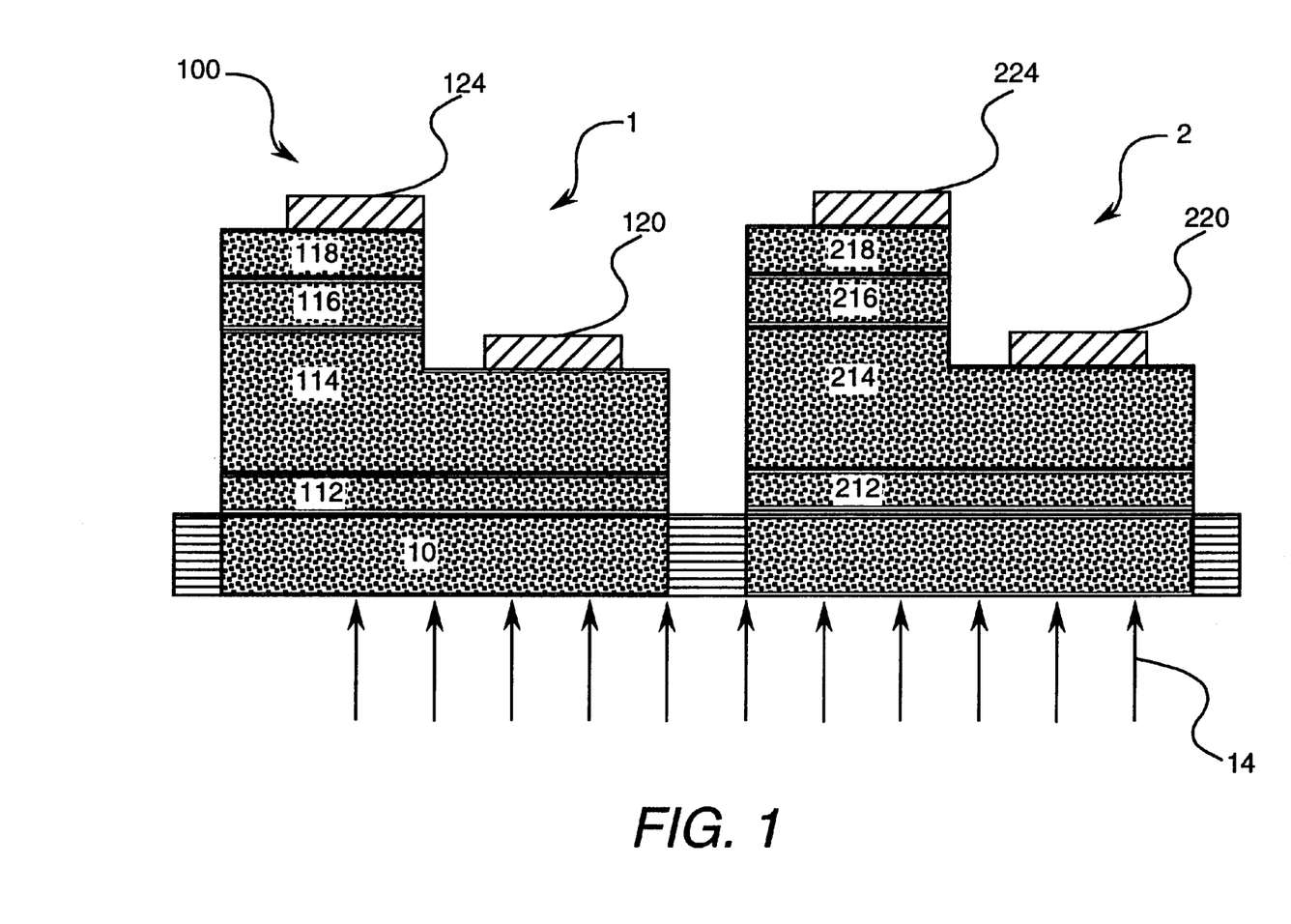
FIGS. 1 and 2 are sectional side and top views respectively of photodetectors used in accordance with one embodiment of the present invention.
Figure 2:
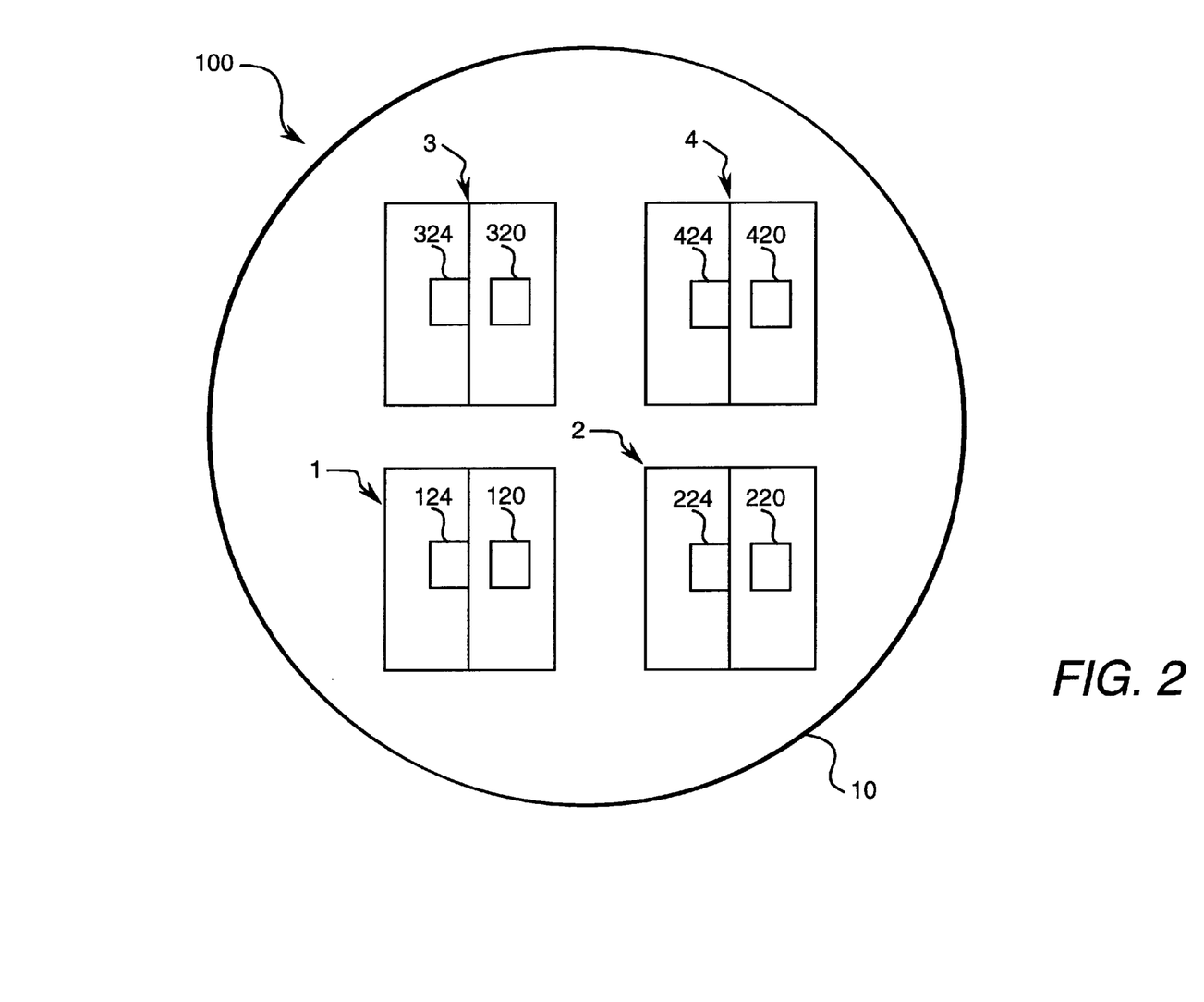
Figure 3:
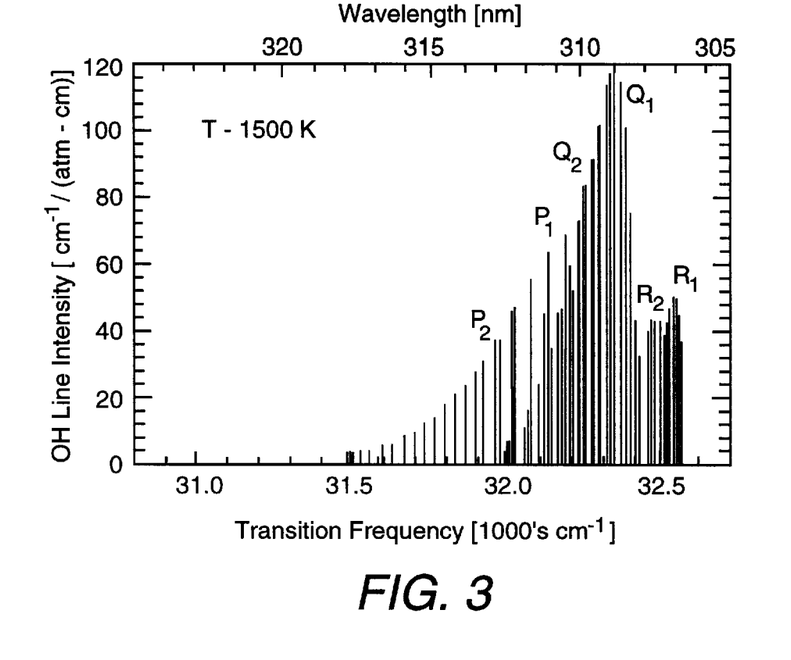
FIGS. 3–6 are graphs illustrating line intensity and distribution of an OH emission at four temperatures.
Figure 4:
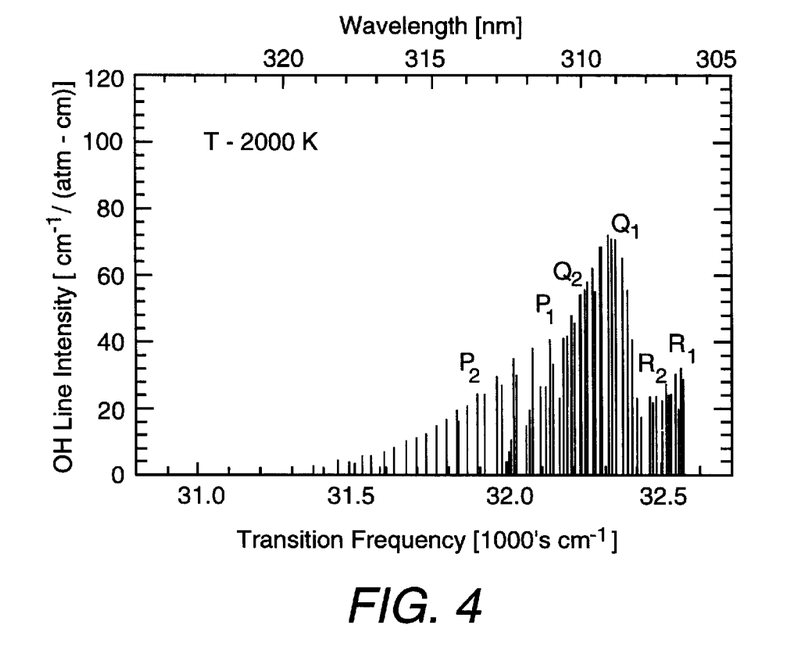
Figure 5:
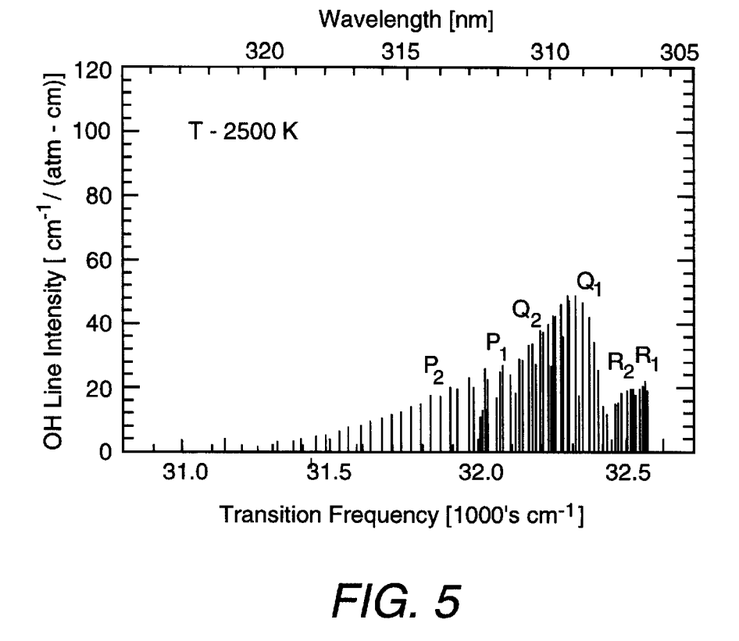
Figure 6:
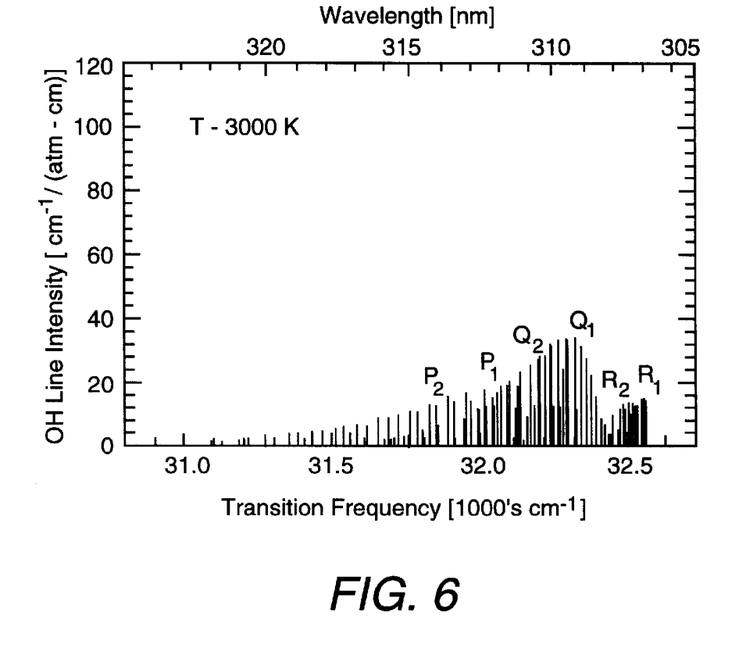

In accordance with one embodiment of the present invention, FIGS. 1 and 2 are sectional side and top views respectively of an optical spectrometer 100 for combustion flame temperature determination. Spectrometer 100 includes at least two photodetectors (shown for purposes of example as four photodetectors 1, 2, 3, 4) positioned for receiving light 14 from a combustion flame, each of the at least two photodetectors having a different bandwidth for detecting a respective output signal within the OH emission band and a computer 34 (shown in FIG. 8) for subtracting a respective output signal of a first one of the at least two photodetectors from a respective output signal of a second one of the at least two photodetectors to obtain a segment signal, and using the segment signal to determine the combustion flame temperature.

The OH emission band for wavelengths in the 310 nanometer (nm) range includes a series of fine emission lines which are produced by various transitions between energy levels of the OH molecule. Both rotational and vibrational transitions occur. The OH molecules in combustion flames are at thermal equilibrium and have emission characteristics which reflect the combustion flame temperature. The intensity and distribution of these lines in the OH emission band in the 310 nm range is shown for four temperatures in FIGS. 3–6. The temperatures between 1500 degrees Kelvin and 3000 degrees Kelvin are typical flame temperatures for a gas turbine combustor.

Gallium nitride (GaN, Eg=3.4 eV) has a maximum wavelength of absorption of about 365 nanometers. That is, GaN is transparent for wavelengths longer than 365 nanometers. Aluminum nitride (AlN, Eg=6.2) has a maximum wavelength of absorption of about 200 nanometers. A class of alloys of GaN and AlN designated $Al_xGa_{x-1}N$ are direct bandgap materials with bandgaps variable between the two extremes of GaN and AlN depending on the amount of aluminum in the alloy. The semiconductors of these alloys have optical transitions directly from valance band to conduction band and do not require phonon assistance for transitions (as compared with silicon carbide where such assistance is required). The cutoff in responsivity is therefore sharp and thus provides for high resolution. Although a specific embodiment of the invention is discussed in terms of $Al_xGa_{x-1}N$, other alloys can be used with direct bandgap alloys being particularly useful.

An array of photodetectors 1–4 (FIGS. 1 and 2) can be used to detect the flame intensity (light 14) in different segments of the OH emission band. The photodetectors may comprise photodiodes or phototransistors, for example. In a preferred embodiment, each photodetector includes alloys which have different bandgaps so as to produce a substantially similar minimum wavelength of optical responsivity and a different maximum wavelength of optical responsivity.

Figure 7:
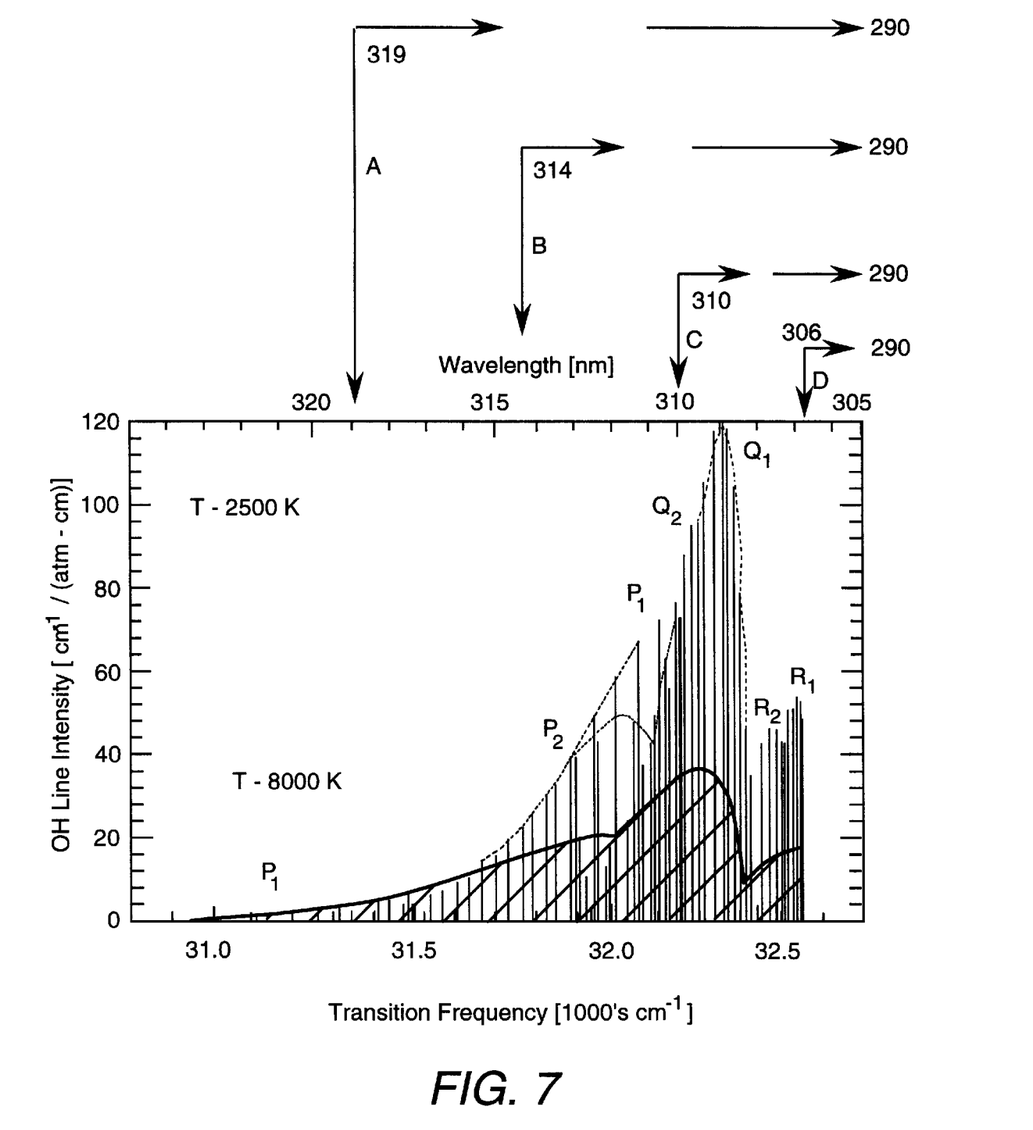
FIG. 7 is a graph illustrating example maximum wavelengths of optical responsivity of the photodetectors of FIGS. 1 and 2.

For example, with respect to FIG. 1, each of two photodetectors 1 and 2 is positioned on a substrate 10 comprising a substantially transparent material which can withstand the combustion environment. On such material, for example, is sapphire having a thickness ranging from about 125 micrometers to about 750 micrometers. A first n type semiconductor layer 114, 214 includes aluminum gallium nitride and has a thickness ranging from about 0.5 micrometers to about 5 micrometers. If the combination of elements results in an alloy of $Al_{0.35}Ga_{0.65}N$, a maximum wavelength of absorption of the first semiconductor layer (and thus a minimum wavelength of optical responsivity of photodetector 1, 2) is established at about 290 nanometers. That is, the alloy will be substantially transparent to wavelengths above 290 nanometers and act as an optical filter to absorb wavelengths below 290 nanometers. Second lightly doped p or n type semiconductor layers 116, 216, in this embodiment, comprise aluminum gallium nitride with different compositions of aluminum providing varying maximum wavelengths of optical responsivity of the photodetectors and a thickness ranging from about 0.2 micrometers to about 1 micrometer. In the embodiment of FIG. 7, the maximum wavelengths of optical responsivity vary from 319 nanometers, 314 nanometers, 310 nanometers, and 306 nanometers. Optional third p type semiconductor layer 118, 218 may then be supported by second semiconductor layer 116, 216 and comprise gallium nitride. In the embodiment of FIG. 1, a first contact pad 120, 220 is supported by first semiconductor layer 114, 214, and a second contact pad 124, 224 is supported by first, second, and third semiconductor layers. The first and second contact pads in one embodiment comprise a metal, an alloy, or layers of metals or alloys including materials such as titanium, nickel, aluminum, or gold, for example, having a thickness ranging from about 1000 angstroms to about 5000 angstroms. Additionally, a buffer layer 112, 212 of aluminum nitride may be present between the first semiconductor layer and the substrate. In one embodiment, the buffer layer has a thickness ranging from about 0.2 micrometers to about 1 micrometer.

Although four photodetectors 1–4 are shown in FIG. 2, as few as two photodetectors 1–2 can be used in accordance with the present invention, and there is no maximum number of photodetectors. Additional photodetectors may provide more accurate results at the expense of equipment and complexity of calculations.

Additionally, although it is preferred that each photodetector have a substantially similar minimum wavelength of optical responsivity, in the event that one more photodetectors has a different minimum wavelength of optical responsivity, one or more filters 12 (shown in FIG. 8) can be used to remove wavelengths which are shorter than the desired minimum wavelength of optical responsivity so that output signals used for temperature determination have substantially similar minimum wavelengths of optical responsivity. Filter 12 preferably comprises an optical filter and in one embodiment is situated between substrate 10 and photodetectors 1, 2, 3, 4.

Moreover, although the invention is discussed in terms of substantially similar minimum wavelengths of optical responsivity for purposes of illustration, it is not necessary that it is the minimum wavelengths of optical responsivity which are substantially similar. For example, in FIG. 1, the variation in aluminum content can occur in first semiconductor layer 114, 214 rather than in second semiconductor layer 116, 216 such that the maximum wavelengths of optical responsivity are similar and the minimum wavelengths of optical responsivity vary.

Regardless of the precise method of obtaining the output signals, the output signals resulting in the present invention comprise at least two output signals having a different bandwidth with either a substantially similar minimum wavelength of optical responsivity or a substantially similar maximum wavelength of optical responsivity.

By subtracting one of the at least two output signals from the other of the at least two output signals, the intensity of the spectral emission lines between the two maximum wavelengths can be determined. For example, the output signals of the photodetectors are labeled A, B, C, and D on FIG. 7. If output signal B is subtracted from output signal A, the resulting signal intensity in the segment signal in the wavelength range of 314 to 319 nanometers can be compared by computer 34 with a look-up table (which may be generated from integrations of curves such as those in FIGS. 3–6 either in graphical or digital form) to determine the temperature.

In the event that the substrate 10 (or optical window) becomes dirty from the combustion environment, the signal reduction for each band will be proportionally reduced such that the intensity will remain an accurate temperature indicator regardless of the substrate or window conditions and the system will be self-compensating.

As discussed above, accuracy will increase by using additional photodetectors. For example, if three photodetectors and two subtractions are performed (A–B and B–C), then additional data is present to use in the look-up table and obtain the temperature determination. Although it is preferred that the shorter bandwidth output signal be subtracted from the longer bandwidth output signal, such orientation is not critical. Additionally, for accuracy it is preferred that segment signals from "adjacent" output signals such as A–B, B–C, and C–D be evaluated, but non-adjacent segment signals from output signals such as A–C or B–D can also be used.

An even more useful analysis technique, which requires at least three photodetectors is to obtain a ratio of intensities of two segment signals. A ratio, like an intensity, is self-compensating and is additionally useful for eliminating the effects of signal drift caused by variance in a gain of a single signal amplifier.

In this embodiment, the computer subtracts a respective output signal (B) of a first one 1 of a first pair 1, 2 of at least three photodetectors 1, 2, 3 from a respective output signal (A) of a second one 2 the first pair of the at least three photodetectors to obtain a first segment signal, and the computer further subtracts a respective output signal (C) of a first one 3 of a second pair 2, 3 of the at least three photodetectors from a respective output signal (B) of a second one 2 of the second pair of the at least three photodetectors to obtain a second segment signal. In this example, the ratio is then obtained of the intensity of the segment signal resulting from A–B divided by the intensity of the segment signal resulting from B–C. The above example is an illustration of one embodiment, any of a number of different ratios can be used. For example, a ratio of intensities of C–A/B–A can also be used.

The OH emission band for wavelengths in the 310 nanometer (nm) range is useful because in this wavelength region signal intensity is high and little interference results from blackbody radiation for combustor wall (not shown) temperatures as high as 1200° C. Although the OH emission band is preferred, the principles can be applied to other spectral bands.

After the ratio is obtained, computer 34 can use a lookup table to determine the combustion flame temperature. The temperature lookup table can be based on ratios of integrations of intensities within segments of curves such as shown in FIGS. 3–6. As discussed above, additional data points provide increased accuracy. If the computer obtains a third segment signal from a third pair of photodetectors and uses it to create an additional ratio, that ratio can be used to enhance the accuracy of the temperature determination. The third segment signal can be obtained either from the non adjacent A–C output signals or, more preferably, from a signal D of a fourth photodiode 4 which can provide an segment signal representative of output signals C–D, for example.

Figure 8:
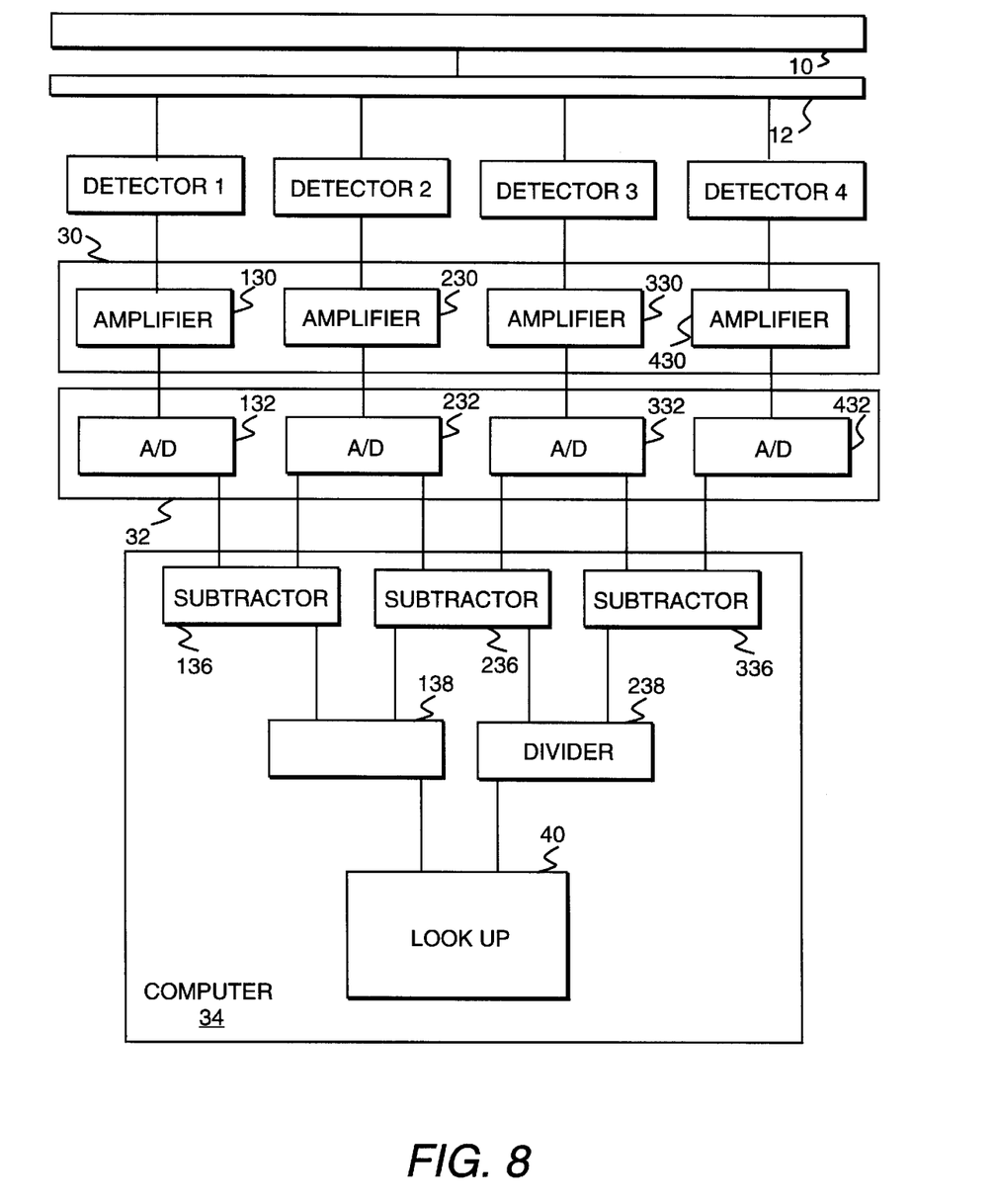
FIG. 8 is a block diagram of a technique for analyzing of the photodetectors of FIGS. 1 and 2 in accordance with an embodiment of the present invention.

FIG. 8 is a block diagram of a technique for analyzing of the photodetectors of FIGS. 1 and 2 in accordance with an embodiment of the present invention illustrating detectors 1–4. If desired, signal amplification can be provided by multiplexing signals from the detectors into one amplifier 30 or by using a number of separate amplifiers 130, 230, 330, 430. Preferably the amplification is performed with an analog operational amplifier.

The signals are then converted by either a single analog-to-digital (A/D) converter 32 or by separate A/D converters 132, 232, 332, 432. Then computer 34 can subtract respective resulting output signals to obtain segment signals with subtractors 136, 236, 336 and obtain ratios of segment signal intensities with dividers 138, 238 prior to using a look up table 40.

If a multiplexer is used for the amplification and/or the A/D conversion, then the computer will include memory for storing individual output signals prior to subtracting and dividing. It is further useful for the computer to perform long term time averaging of the output signals prior to subtracting so as to reduce effects of noise. Such time averaging could occur on the order of hours or days, for example.

In another embodiment, the system can be designed to sense flame outs or ignitions rapidly. Information as to flame presence and average temperature can be directed on a real time basis to a control system of the computer. Closed loop control can be used to optimize the fuel-to-air ratio for minimizing nitrogen oxide and carbon monoxide emissions produced by combustion.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An optical spectrometer for combustion flame temperature determination, the spectrometer comprising:
   at least two photodetectors positioned for receiving light from a combustion flame, each of the at least two photodetectors having a different, overlapping bandwidth for detecting a respective output signal in an OH emission band; and
   a computer for
      subtracting a respective output signal of a first one of the at least two photodetectors from a respective output signal of a second one of the at least two photodetectors to obtain a segment signal, and
      using the segment signal to determine the combustion flame temperature.

2. The spectrometer of claim 1 wherein each of the at least two photodetectors has a substantially similar minimum or maximum wavelength of optical responsivity.

3. The spectrometer of claim 1 further including an optical filter for filtering at least one of the respective output signals so that each output signal of the at least two photodetectors has a substantially similar minimum or maximum wavelength of optical responsivity prior to subtraction by the computer.

4. The spectrometer of claim 1 wherein the computer includes a look-up table for using the segment signal to determine the combustion flame temperature.

5. The spectrometer of claim 1 wherein the at least two photodetectors each comprise:
   a first semiconductor layer including aluminum gallium nitride;
   a first contact pad supported by the first semiconductor layer;
   a second semiconductor layer including aluminum gallium nitride supported by the first semiconductor layer;
   a second contact pad supported by the first and second semiconductor layers,
   wherein the respective first or second semiconductor layers of the at least two photodetectors include different levels of aluminum.

6. The spectrometer of claim 1 wherein the computer further subtracts a respective output signal of a first one of a third pair of the at least three photodetectors from a respective output signal of a second one the third pair of the at least three photodetectors to obtain a third segment signal, and calculating a ratio of intensities of the third segment signals and one of the first and second segment signals for use in determining the combustion flame temperature.

7. An optical spectrometer for combustion flame temperature determination, the spectrometer comprising:
   at least three photodetectors positioned for receiving light from the combustion flame, each of the at least three photodetectors having a different, overlapping bandwidth for detecting a respective output signal; and
   a computer for
      subtracting a respective output signal of a first one of a first pair of the at least three photodetectors from a respective output signal of a second one the first pair of the at least three photodetectors to obtain a first segment signal,
      subtracting a respective output signal of a first one of a second pair of the at least three photodetectors from a respective output signal of a second one the second pair of the at least three photodetectors to obtain a second segment signal, and
      calculating a ratio of intensities of the first and second segment signals, and
      using the ratio to determine the combustion flame temperature.

8. The spectrometer of claim 7 wherein each of the at least three photodetectors detects the output signal in an OH emission band.

9. The spectrometer of claim 8 wherein each of the at least three photodetectors has a substantially similar minimum or maximum wavelength of optical responsivity.

10. The spectrometer of claim 8 further including an optical filter for filtering at least one of the respective output signals prior to subtraction by the computer.

11. The spectrometer of claim 8 wherein the at least three photodetectors each comprise:
   a first semiconductor layer including aluminum gallium nitride;
   a first contact pad supported by the first semiconductor layer;
   a second semiconductor layer including aluminum gallium nitride supported by the first semiconductor layer; and
   a second contact pad supported by the first and semiconductor layers,
   wherein the respective first or second semiconductor layers of the at least three photodetectors include different levels of aluminum.

12. The spectrometer of claim 8 wherein the computer includes a look-up table for using the ratio to determine the combustion flame temperature.

13. A method for combustion flame temperature determination comprising:
   detecting light from the combustion flame and obtaining at least two output signals of the combustion flame in an OH emission band, each of the at least two output signals having a different, overlapping bandwidth with a substantially similar minimum or maximum wavelength of optical responsivity;
   subtracting a first one of the two output signals from a second one of the at least two output signals to obtain a segment signal, and
   using the segment signal to determine the combustion flame temperature.

14. The method of claim 13 wherein obtaining at least two output signals further includes filtering at least some of the detected light.

15. The method of claim 13 wherein determining the combustion flame temperature includes using a look-up table.

16. A method for combustion flame temperature determination comprising:
- detecting light from the combustion flame and obtaining at least three output signals of the combustion flame, each of the at least three output signals having a different, overlapping bandwidth with a substantially similar minimum or maximum wavelength of optical responsivity;
- subtracting a respective output signal of a first one of a first pair of the at least three output signals from a respective output signal of a second one the first pair of the at least three output signals to obtain a first segment signal,
- subtracting a respective output signal of a first one of a second pair of the at least three output signals from a respective output signal of a second one the second pair of the at least three output signals to obtain a second segment signal, and
- calculating a ratio of intensities of the first and second segment signals, and
- using the ratio to determine the combustion flame temperature.

17. The method of claim 16 wherein obtaining at least two output signals further includes filtering at least some of the detected light.

18. The method of claim 16 further including
- subtracting a respective output signal of a first one of a third pair of the at least three output signals from a respective output signal of a second one the third pair of the at least three output signals to obtain a third segment signal,
- calculating an additional ratio of intensities of the third segment signals and one of the first and second segment signals, and
- using the additional ratio in determining the combustion flame temperature.

19. An optical spectrometer for combustion flame temperature determination, the spectrometer comprising:
- means for obtaining at least two output signals of the combustion flame in an OH emission band, each output signal having a different, overlapping bandwidth with a substantially similar minimum or maximum wavelength of optical responsivity;
- means for subtracting a first one of the two output signals from a second one of the at least two output signals to obtain a segment signal, and
- means for using the segment signal to determine the combustion flame temperature.

20. An optical spectrometer for combustion flame temperature determination, the spectrometer comprising:
- means for detecting light from the combustion flame and obtaining at least three output signals of the combustion flame, each output signal having a different, overlapping bandwidth with a substantially similar minimum or maximum wavelength of optical responsivity;
- means for subtracting a respective output signal of a first one of a first pair of the at least three output signals from a respective output signal of a second one the first pair of the at least three output signals to obtain a first segment signal,
- means for subtracting a respective output signal of a first one of a second pair of the at least three output signals from a respective output signal of a second one the second pair of the at least three output signals to obtain a second segment signal, and
- means for calculating a ratio of intensities of the first and second segment signals, and
- means for using the ratio to determine the combustion flame temperature.

21. The method of claim 20 further including
- means for subtracting a respective output signal of a first one of a third pair of the at least three output signals from a respective output signal of a second one the third pair of the at least three output signals to obtain a third segment signal,
- means for calculating an additional ratio of intensities of the third segment signals and one of the first and second segment signals, and
- means for using the additional ratio in determining the combustion flame temperature.

* * * * *